United States Patent [19]

Clugston

[11] 4,192,256

[45] * Mar. 11, 1980

[54] COMBINED FEEDING AND WATERING DEVICE FOR PETS, HAVING INTEGRAL MEANS FOR CARRYING WATER

[76] Inventor: George D. Clugston, R.R. #3, Box 203, Pittsburg, Kans. 66762

[*] Notice: The portion of the term of this patent subsequent to Nov. 30, 1997, has been disclaimed.

[21] Appl. No.: 955,917

[22] Filed: Oct. 30, 1978

[51] Int. Cl.$^2$ ............................ A01K 5/01; A01K 7/00
[52] U.S. Cl. ...................................... 119/51.5; 119/77
[58] Field of Search .................... 119/77, 51.5, 72, 61

[56] References Cited

U.S. PATENT DOCUMENTS

| 198,744 | 1/1878 | Johnson | 119/77 |
|---|---|---|---|
| 315,251 | 4/1885 | Cook | 119/77 |
| 395,490 | 1/1889 | French | 119/51.5 |
| 1,136,510 | 4/1915 | Crum | 119/77 |

*Primary Examiner*—Hugh R. Chamblee

*Attorney, Agent, or Firm*—Schmidt, Johnson, Hovey & Williams

[57] ABSTRACT

A compact, unitary pet dish especially useful during automobile or camping trips is provided which serves as both a pet food and watering station, and is designed to minimize water spillage during road travel. The dish preferably includes walls defining a water compartment and an exterior food-receiving cavity or recess in the top thereof. A combination watering cup and carrying handle is mounted on the exterior of one compartment wall and is in communication with the interior of the compartment through a selectively openable water flow aperture. An upright wall or partition is located within the water compartment adjacent and transverse to the water flow aperture and serves, along with the recessed, food cavity-defining walls, to dampen vibration-induced movement of water within the compartment. The aperture and watering cup are also cooperatively designed so that a vacuum lock is established when the cup is filled, in order to provide a constant supply of water without overflowing the cup.

5 Claims, 4 Drawing Figures

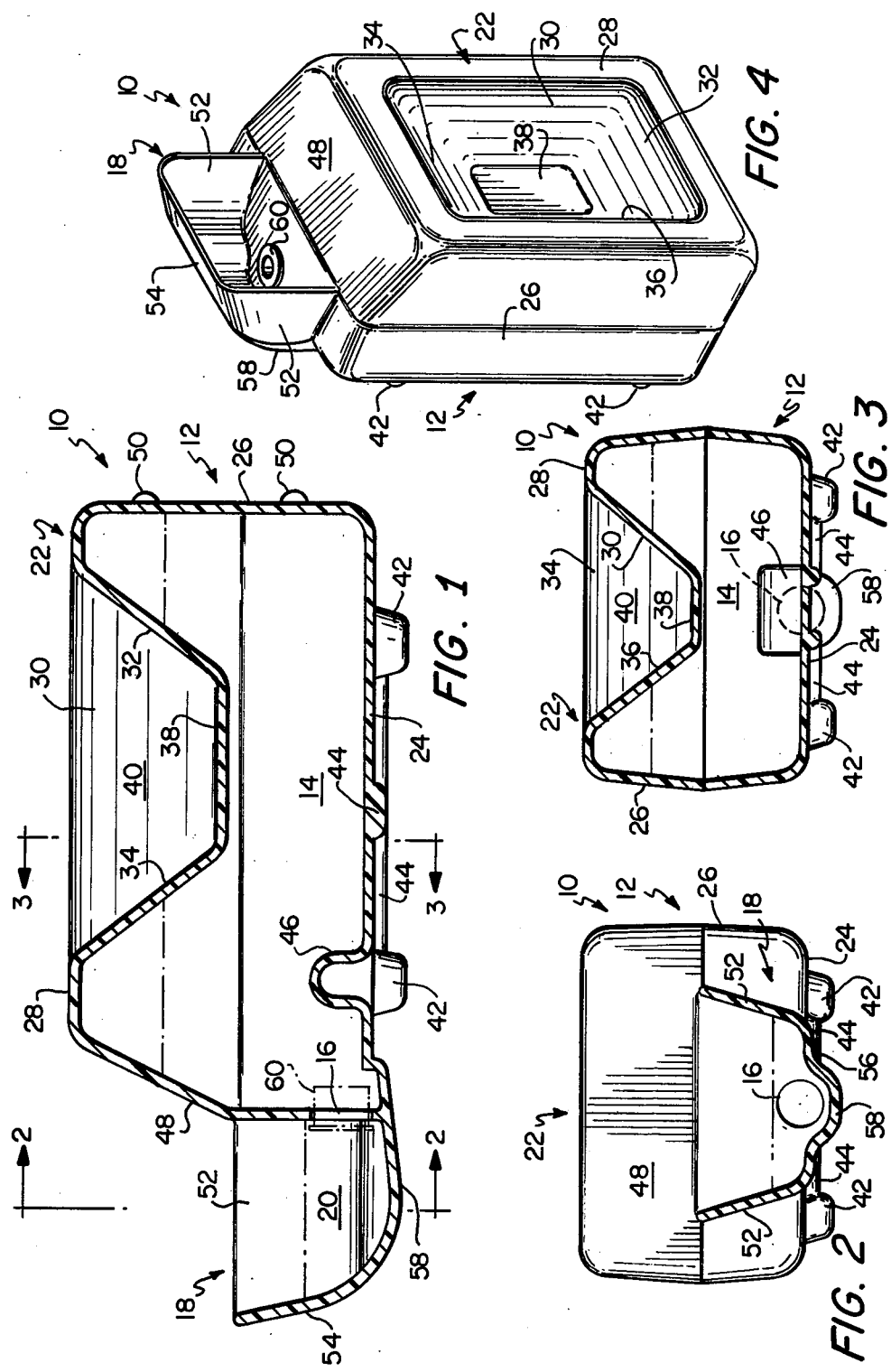

COMBINED FEEDING AND WATERING DEVICE FOR PETS, HAVING INTEGRAL MEANS FOR CARRYING WATER

BACKGROUND OF THE INVENTION

1. Field of the Invention

This invention relates to a pet feeding and watering dish of simple yet highly effective construction which has numerous advantages including easy portability, compactness, and the ability to be used even in a moving automobile or camper without fear of water spillage and the like. More particularly, it is concerned with a pet dish having an apertured, water holding compartment, a combination carrying handle and pet watering cup, and structure for dampening vibration-induced movement of the water within the compartment so as to prevent sloshing and spillage of water.

2. Description of the Prior Art

Many people who travel long distances by automobile or recreational vehicle, as during vacations or camping trips, wish to include their pet as a member of the traveling party. In such cases a problem is presented because of the need to feed and water the pet, even when the vehicle is in motion. As can be appreciated, the obvious expedient of providing separate food and water dishes of the conventional variety leaves much to be desired, since water in a dish or bowl inevitably tends to spill or overflow its container when the vehicle is in motion. At the same time however, a constant supply of water must be made available for the pet. Also, separate food and water dishes are cumbersome and take up valuable space in a recreational vehicle or automobile for example.

A number of feeding and/or watering devices have been proposed in the past for livestock and pets. In general however, these units have not met the needs of travelers because of lack of portability or relatively large size. Patents illustrating these prior units include: U.S. Pat. Nos. 455,756, 712,243, 823,697, 1,482,466, 3,152,576, 364,557, 848,492, 905,278, and 1,113,887.

SUMMARY OF THE INVENTION

The problems outlined above are in large measure solved by the pet dish in accordance with the present invention. That is to say, the dish hereof is of lightweight, compact construction, serves as both a feeding and watering station, and is specially designed to minimize the possibility of water spillage therefrom.

The pet dish in accordance with the present invention broadly includes a substantially enclosed water holding compartment, and an external, cuplike recessed member secured to an outer wall of the compartment, and structure defining a water flow aperture through a wall of the cavity which communicates the latter with the recess defined by the cuplike member such that the latter is filled with water. Preferably, the compartment walls are imperforate save for the water flow aperture, and the latter is located adjacent the base of the watering cup, so that as water flows into the latter the aperture is covered and a vacuum seal is established to thereby prevent flow of additional quantities of water into the exterior cup.

In particularly preferred forms, the top wall of the compartment includes inwardly extending wall sections which define a food-holding cavity. Additionally, an upright, elongated, relatively short wall or partition is located within the water compartment adjacent the water flow aperture and generally transverse to the axis of the latter. This partition serves, in cooperation with the inwardly extending top wall sections, to dampen any movement of water within the compartment which may be caused by vibrations or the like from a moving vehicle.

BRIEF DESCRIPTION OF THE DRAWING

FIG. 1 is a vertical sectional view of the preferred pet dish in accordance with the present invention;

FIG. 2 is a vertical sectional view taken along line 2—2 of FIG. 1 which illustrates the external watering cup and water flow aperture provided with the pet dish;

FIG. 3 is a vertical sectional view taken along line 3—3 of FIG. 1 and illustrates the internal construction of the water holding compartment of the pet dish; and FIG. 4 is a perspective view of the pet dish in accordance with the invention, shown in an upright orientation for easy carrying or storage.

DESCRIPTION OF THE PREFERRED EMBODIMENT

Referring now to the drawing, a pet feeding and watering dish 10 in accordance with the invention broadly includes structure 12 which defines a substantially enclosed water-holding compartment 14, a water flow aperture 16, and a cuplike, recessed member 18 located and extending from the structure 12. The member 18 is configured to present an effective handle for grasping and carrying of the overall dish 10, and is located, relative to aperture 16, for communicating compartment 14 and the interior or recess 20 of member 18 so that water will flow from compartment 14 into recess 20 when dish 10 is disposed in a pet-watering position with the member 18 presenting a generally horizontal, open top, water holding cup (see FIGS. 1 and 2).

In more detail, pet watering dish 10 is of integral construction and is preferably formed of a lightweight synthetic resin material. The structure 12 includes a top wall 22, a bottom wall 24, and a continuous circumscribing sidewall 26. Top wall 22 includes a rectangular, continuous, outermost marginal panel 28, four inwardly extending and converging wall sections 30, 32, 34, and 36 of truncated triangular configuration, and a generally planar bottom panel section 38. As will be appreciated, the sections 30, 32, 34 and 36, and panel 38, present a food-receiving cavity 40 at the top of dish 10.

Bottom wall 24 is of generally planar construction, but includes four cylindrical, downwardly extending legs 42. Diagonally spaced pairs of the legs 42 are interconnected by elongated, downwardly extending reinforcing projections 44 of approximate semicircular cross section which serve to rigidify the dish 10 during use. In addition, bottom wall 24 is configured to present an upwardly extending relatively short, elongated wall or partition 46 within cavity 14, the purpose of which will be explained in detail hereinafter.

Sidewall 26 includes a sloped front panel 48 which allows easy access to the water holding cuplike member 18 by a pet, while the remainder of sidewall 26 is substantially vertical when the dish is in its operative position illustrated in FIGS. 1-3. In addition, four spaced, outwardly extending projections 50 are provided on the portion of sidewall 26 remote from panel 48; these projections serve as support legs for dish 10 when the latter is in its vertical storage position illustrated in FIG. 4.

Cuplike member 18 includes a pair of outwardly extending, upright sidewall portions 52, a connecting front wall portion 54, and a bottom wall 56 having an elongated depression 58 therein. As will be readily seen, cuplike member 18 is located below front panel 48 such that the water flow aperture 16 serves to communicate the compartment 14 and recess 20. In this connection it will be seen that the recess 16 is located adjacent the bottom of recess 20 or proximal to depression 58.

Dish 10 also includes a removable plug 60 which can be selectively inserted within aperture 16 so as to completely block water flow between compartment 14 and recess 20. Plug 60 is of course used when dish 10 is in its storage or carrying position illustrated in FIG. 4.

In use, the compartment 14 is filled with water through aperture 16 prior to leaving on a trip, and plug 60 is thereafter placed within the aperture 16 to prevent water spillage. The water filled dish 10 can then be easily carried and transported simply by grasping the member 18, and lifting and carrying the entire dish. To this end, cuplike member 18 is of a width to accommodate an adult's hand and thereby presents a convenient carrying handle.

During travel, the dish 10 can be used by removing plug 60 and placing the dish 10 in its operative horizontal position illustrated in FIGS. 1-3. When this occurs, water initially flows from the compartment 14 into recess 20. Water flow in this fashion continues until the aperture 16 is covered with water. At this point, because of the imperforate nature of the walls defining compartment 14 (save for aperture 16) a vacuum seal or lock is established, and this in turn means that no more water can flow into recess 20. As the pet drinks from the member 18 however, the water level within the latter is lowered, and additional quantities of fresh water can then flow into the watering cup. Thus, dish 10 provides an automatic filling function without the need for constant attention by the pet owner.

In addition, the overall construction of the dish 10 serves to effectively dampen any waves or water movement within compartment 10 which could occur because of movement of the travel vehicle. Particularly, provision of the partition 46 adjacent to aperture 16 (see FIG. 1) and generally transverse to the axis of the aperture, serves to dampen such undesirable water movements. Moreover, the inwardly extending wall sections defining the food cavity 40, and particularly panel section 38, cooperates with partition 46 for dampening purposes. It is noted in this regard that panel section 38 is below the water level within the compartment 14 when the latter is full, so as to effectively restrict water movement.

It will also be appreciated that dish 10 can be used to simultaneously feed and water the pet. That is to say, pet food can be placed within the external cavity 40, so that the pet can eat therefrom. It will be noted that this function is accomplished without in any way disturbing the watering function of the dish.

When it is again desired to store or carry dish 10, it is only necessary to replug aperture 16 with the plug 60, pour out any excess water within the cuplike member 18, and grasp and transport the pet dish as described above.

having thus described the invention, what is claimed as new and desired to be secured by Letters Patent is:

1. A pet dish, comprising:
    structure having top, bottom and sidewalls defining a water-holding compartment, and a water-flow aperture through one of said sidewalls, said top wall including inwardly extending wall sections cooperatively presenting a recessed, foodreceiving cavity;
    a cuplike, open-top, recessed member secured to the exterior of said apertured sidewall,
    said water flow aperture and member being cooperatively located for communicating said compartment and the recess of said member such that water will flow from said compartment to said recess of said member; and
    partition means located within said compartment proximal to said aperture and cooperable, with said wall sections, for dampening vibration-induced movement of water within the compartment.

2. The dish as set forth in claim 1 wherein said partition means extends generally transversely relative to the axis of said aperture.

3. The dish as set forth in claim 1 wherein said compartment-defining walls are imperforate save for said water flow aperture, the latter being located adjacent the bottom of said recess whereby water flowing into said member from said compartment will cover and block said aperture and thereby establish a vacuum lock preventing escape of additional water from said compartment.

4. The dish as set forth in claim 1 including removable means for selective plugging of said aperture.

5. The dish as set forth in claim 1 wherein said member is configured to serve as a handle for grasping and carrying of said dish.

* * * * *